Aug. 9, 1932.  J. A. FLANZER  1,870,619
ROASTER
Filed July 5, 1928   2 Sheets-Sheet 1
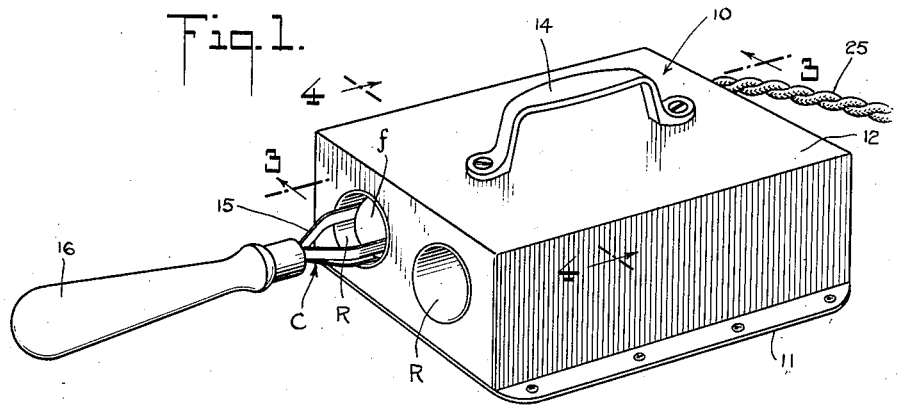
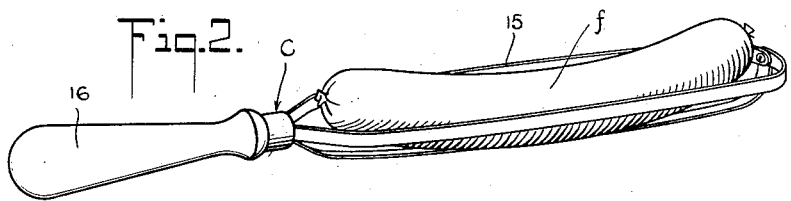
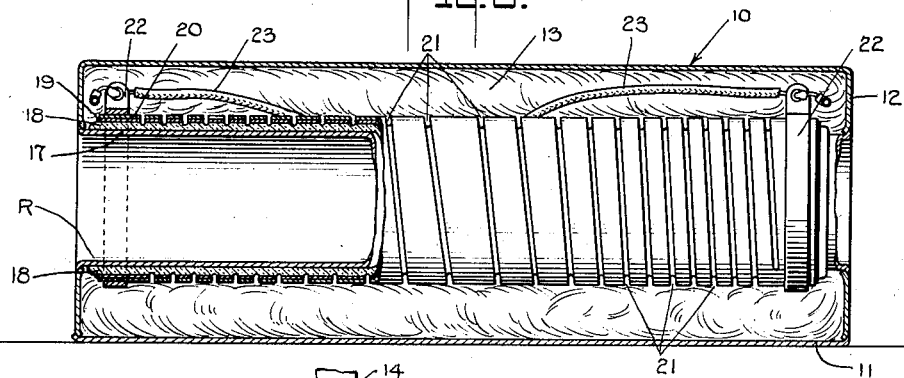
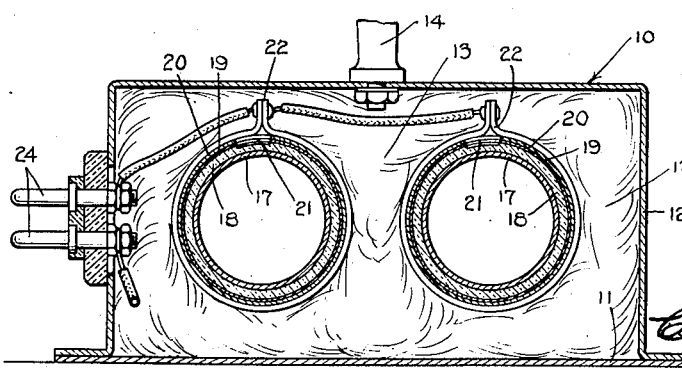
INVENTOR
Joseph A Flanzer
BY
ATTORNEYS Aug. 9, 1932.  J. A. FLANZER  1,870,619
ROASTER
Filed July 5, 1928   2 Sheets-Sheet 2
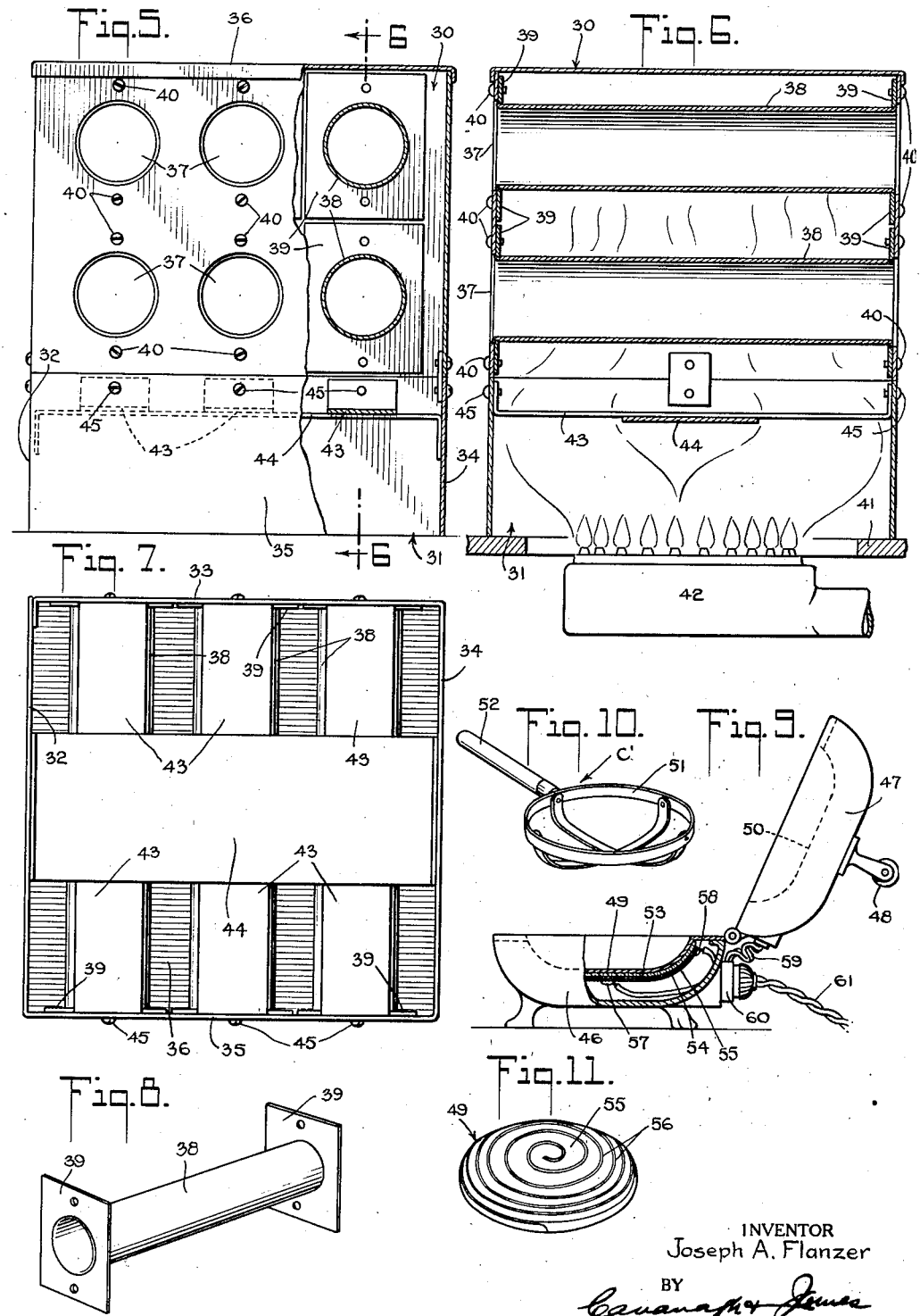
INVENTOR
Joseph A. Flanzer
BY
ATTORNEYS Patented Aug. 9, 1932

1,870,619

UNITED STATES PATENT OFFICE

JOSEPH A. FLANZER, OF BROOKLYN, NEW YORK, ASSIGNOR, BY MESNE ASSIGNMENTS, OF ONE-HALF TO TECHNIDYNE CORPORATION, OF NEW YORK, N. Y., A CORPORATION OF NEW YORK, AND ONE-HALF TO MAXWELL JAMES, OF NEW YORK, N. Y.

ROASTER

Application filed July 5, 1928. Serial No. 290,515.

This invention relates to the art of roasting or heating edibles, and relates more particularly to a method of and apparatus for roasting edibles having a pre-formed shape or pre-determined dimensions; and has special reference to the provision of a roaster or toaster for ground meats such as frankfurters and the like.

The prime object of my present invention centers about the provision of a method of and apparatus for roasting ground meats such as frankfurters and the like which constitute an improvement in the manner of handling and preparing such edibles over the practices now in vogue. It has been customary to roast ground meats such as frankfurters by either boiling the same in water or by frying on an open pan or flat iron griddle. As is well known, the method of toasting frankfurters on an open griddle disadvantageously consumes both a substantial time and constant attention, since it takes from ten to fifteen minutes to toast a frankfurter by the griddle method and very often frankfurters will be left on the griddle for as long as 30 minutes, requiring constant attention to prevent over-roasting or burning. The griddle type of apparatus, moreover, is ill adapted for home or kitchen use, so that for home use the boiling method is commonly resorted to. By means of the method and apparatus of the present invention, these and other disadvantages inherent in former roasting methods are eliminated, so that frankfurters and like edibles may be completely toasted within the short space of a minute or two, with the result that the meat may be prepared and served on short order, the method of the invention having the further result of imparting a new and delectable flavor to the toasted product, the roasting apparatus being furthermore adapted for both commercial and home kitchen use.

To the accomplishment of the foregoing and such other objects as will hereinafter appear, my invention consists in the elements and their relation one to the other as hereinafter more particularly described and sought to be defined in the claims; reference being had to the accompanying drawings which show the preferred embodiments of my invention, and in which:

Fig. 1 is a perspective view of one form of roasting apparatus embodying the invention, Fig. 2 is a perspective view of a part thereof showing the manner of its use, Fig. 3 is a view taken on an enlarged scale in cross-section in the plane of the line 3—3, Fig. 1, Fig. 4 is a cross-sectional view thereof taken in the plane of the line 4—4, Fig. 1, Fig. 5 is a front elevational view of a modified form of the invention with a part broken away to disclose the interior construction thereof, Fig. 6 is a view taken in cross-section in the plane of the line 6—6, Fig. 5, Fig. 7 is a bottom plan view of the modification shown in Fig. 5, Fig. 8 is a view of a detail, Fig. 9 is a view of a further modified form of the invention with a part broken away, Fig. 10 is a part employed in the apparatus of Fig. 9, and Fig. 11 is a view of a detail.

Referring now more in detail to the drawings, and having reference first to Figs. 1 and 2 thereof, wherein I show one embodiment which my invention may take, the method of the invention is shown to consist of roasting an edible of a preformed shape or predetermined dimensions such as a frankfurter $f$, by encasing the same in a receptacle R having an internal shape or internal dimensions substantially the same as those of the edible, whereby the receptacle R forms an envelope for the edible, the said receptacle being heated substantially over its complete enveloping surface. The receptacle R, which in the embodiment shown in Figs. 1 and 2 of the drawings is tubular and cylindrical, is open at both ends, the frankfurter $f$ being introducable in the receptacle from either end and preferably the tubular heating receptacle R has a length slightly greater than that of the frankfurter $f$. This tubular receptacle is heated to a temperature of about 300° C., and high enough to roast a frankfurter in about one to two minutes, the envelope receptacle being heated substantially uniformly over its entire enveloping surface so that the frankfurter is treated at the same time and uniformly over its complete exposed area. I have found that by this method frankfurters may be prepared not only on short order, but that the flavor imparted to the frankfurter is different and more delicious than that obtained with the ordinary griddle toasted frankfurter. It will be noted that by encasing the edible in an envelope heater closely fitting the same, the heat, preferably uniformly distributed over the length of the heater, is concentrated upon all parts of the edible, resulting in the rapid and efficient toasting of the same.

The toasting apparatus may be made in gang formation so as to treat a plurality of banked frankfurters or the like, and in the embodiment shown in Figs. 1 to 4 of the drawings, I show a portable gang toaster designed for home use and adapted to be operated electrically by attachment to a power line socket. Such a toaster may comprise a metal frame enclosure 10 which serves as a convenient holder for a plurality, such for example as two, tubular receptacles R, R, the said holder comprising a bottom plate 11 to which is affixed a rectangular-shaped container 12, to the front and rear walls of which are swaged the ends of the tubes R, R. The space within the metal frame enclosure 10 may be either left empty or filled with a heat insulating material 13 such as powdered asbestos, and the top of the holder 10 may be provided with a heat insulating handle 14.

In the operation of this roaster, where the internal dimensions of the envelope receptacle closely aproximate those of the edible, some difficulty may be experienced in the removal of the roasted edible due to a tendency of the edible, such as the frankfurter, to stick to the wall of the heating receptacle by reason of over-heating or lack of fat on some one or more regions in the receptacle. To obviate any such tendency to sticking or adhering of the edible to the receptacle wall, there is preferably employed a carrier C for the edible which is designed to facilitate the handling of the edible and the insertion and removal thereof to and from the toasting apparatus. Preferably this carrier C comprises a cradle construction 15 connected to a heat insulating handle 16. The cradle 15 is preferably open at its top and is provided with three or more longitudinal flat strips of thin sheet steel curved to conform to the surface of the frankfurter $f$ and the heating receptacle R. The frankfurter $f$ is first placed in the cradle C in the manner shown in Fig. 2 of the drawings, and the cradle carrier with its contents is then inserted into the heating receptacle R. With the use of this carrier, the frankfurter can be easily removed from the heater, and when the frankfurter sticks at one or more regions to the walls of the receptacle, the adhesion can be readily broken by rotating the carrier C by means of its handle 16, the strips of the cradle 15 acting as slicing knives to cut or wedge apart the adhering surfaces. This carrier also has the advantage of rendering it unnecessary to handle the hot frankfurter, as well as of insuring cleanliness in handling, since after the carrier C is removed with the frankfurter $f$ therein, the carrier can be inverted and the frankfurter dropped into the usual split roll.

The toasting unit shown in Figs. 1 to 4 of the drawings is of the portable electric type, the heating receptacles R, R being designed for use with ordinary house lighting current. To accomplish these ends, the heating receptacles R, R are designed to embody a construction such as is more particularly described and claimed in my copending application Ser. No. 290,514, filed July 5, 1928. Preferably the tubes R, R may be made of pyrex, porcelain, isolantite or enameled iron, the outer surface of which is coated with a resistance paint or electrically conductive material so designed and constructed as to develop the desired temperatures with the use of 110 volts on either A. C. or D. C. lines. In the embodiment shown in the drawings, a receptacle R comprises an iron or steel tube 17 coated with a vitreous and electrical insulating enamel 18 on its external surface, and this insulating enamel coating 18 is painted with a coating 19 of a resistance paint such as is described and claimed in the copending application of Lester L. Jones et al, Serial No. 167,583, filed Feb. 11, 1927; and the said paint coating 19 is in turn electro-plated with a nickel coating 20 in the manner set forth in another application of Lester L. Jones et al, Serial No. 260,987 filed March 12, 1928, to produce a heater such as is more particularly described and claimed in my aforementioned application. In this construction the nickel film 20 is the resistance film in which the heat is developed during the passage of an electric current, the paint film 19 serving as a coating upon which the nickel film may be quickly electro-plated and to which the nickel film very firmly adheres. The conductive films 19 and 20 are preferably adjusted to the proper resistance value by the spiralling method described in the patent to Lester L. Jones No. 1,635,184, of July 12, 1927, such spiralling being indicated in Fig. 3 of the drawings by the reference character 21.

I have found that for effecting a desired uniform heating or roasting of the frankfurer throughout its entire length, the heat to be developed at the ends of the tubular receptacle R should be more intense than that developed at its center. The cause for this is in all probability due to the greater powers of radiation and conduction of the heat at the ends of the tube than at its center. For this reason the spiralling 21 is formed with helixes of small pitch at the ends of the tube, and with helixes of larger pitch at the center of the tube, all as clearly shown in Fig. 3 of the drawings. It has been found that a tube the electrical film of which is spiralled to a resistance value of 100 ohms yields the proper heat necessary for roasting a frankfurter when the applied voltage is 110 to 120 volts. As shown in the diagram, the average nickel film of .0002 inches thickness may be spiralled to 100 ohms on a 5-inch length by using on the average five threads per inch.

For connecting the tubular receptacles together in circuit, contact bands 22, 22 are fastened to the ends of the nickel film 20 and these bands are attached to electric wires 23, 23 which are in turn connected to a plug or receptacle 24 attached to a wall of the holder 10, the said plug receptacle being adapted to be connected to an electric cord 25 attachable to a house lighting socket.

With the use of the electrical heating receptacle R, I have found that the apparatus heats up very rapidly when first connected to the electric current, this being brought about because the nickel resistance film 20 has a high positive temperature coefficient. The power consumed at the moment of starting is about 140 watts per tube as against 70 watts when the tube becomes hot. This characteristic is desirable because it automatically cuts down the current as the temperature increases, and should the tube be left operating without heat being withdrawn by roasting the frankfurters, the current flowing through the unit receptacle drops automatically as the temperature rises, thereby preventing burning out of the resistance element and also resulting in increased economy. The unit is ordinarily made to operate at 100 to 120 volts, but may also be made to operate on six voltage storage batteries such as those used in automobiles, or may be made to operate on any other voltage by simply adjusting the resistance value of the nickel film to the proper magnitude. By this means the toaster may be employed with great convenience in the home, and may be also used on outings or picnics by attachment to the storage battery of an automobile.

The advantages of the construction shown in Figs. 1 to 4 of the drawings will now be readily apparent. Besides permitting frankfurters to be toasted upon short order and producing an improved-tasting edible product which is handled in a very sanitary manner, the apparatus is constructed so as to be electrically heated, thus allowing installation thereof in places where gas is unavailable, and is constructed so as to produce a portable and serviceable device. The toaster is extremely economical, as most of the heat developed is transmitted by conduction through the wall of the tube to the frankfurter and very little heat is wasted. The apparatus is relatively inexpensive, and can be built in multi-tubular form containing any number of toasting tubes. The toasting tubes can be made replaceable at a small cost. The heating is extremely uniform owing to the use of the resistance paint and nickel film which heats all areas substantially equally.

In Figs. 5 to 7 of the drawings, I show a modified form of the toasting apparatus of my invention adapted to be heated by external heat such as gas and constructed so as to be capable of being set on top of the ordinary home gas stove or range.

In this form of the invention the toaster comprises a casing generally designated as 30 open at its bottom 31 and provided with enclosing side walls 32 to 35 and a top wall 36 forming a closure for the casing, the said casing being made of sheet metal parts secured together by any suitable securing means. A pair of opposed walls such as 33 and 35 of the casing are provided with apertures or windows 37, and to said walls are attached a plurality of tubular receptacles 38—38, one of which is shown detached in Fig. 8 of the drawings, the ends of said tubular receptacles registering with the windows 37, the said tubular receptacles forming the enveloping tubes for the edibles to be roasted. Each of the tubular receptacles 38 may comprise a sheet metal tube having flanged sections 39—39 swaged to the ends of the tubes, the said flanged sections providing means securable to the opposite walls 33 and 35 of the casing by means of securing elements 40—40. The tube 38 and its attached flanges 39—39 form a readily replaceable heating unit.

For the purpose of effecting a uniform application of heat around the circumference and along the length of the heating tubes 38, it is desirable as aforesaid to apply a more intense heat at the ends of the tubes and a less intense heat at their centers. In use the roaster is mounted on a stove support 41 and over a burner 42, as shown in Fig 6 of the drawings. The casing 30 thus provides a holder for trapped hot air which uniformly heats all of the tubular receptacles 38. It is desired, however, to prevent overheating of the bottom bank of tubes which are closest to the burner 42, which would result if these tubes were directly exposed to the burner 42. For the purpose, therefore, of differentially applying the heat to the different sections of the tubes and for uniformly heating the tubes circumferentially thereof, I provide a plurality of longitudinally arranged baffles 43—43 which are disposed in line with the bottom bank of tubes so as to prevent direct heating of the lower halves of these tubes, and I further provide a transverse or cross baffle 44 arranged so that the mid-portions of the tubes are less intensely heated than the end portions thereof. The baffles may be made of the same material as the walls of the casing 30 and may be punched from a single piece of metal or from strips of metal fastened together and to the walls of the toaster 30 by means of securing elements such as 45—45. As will be understood, the carrier C for the edibles such as shown in Figs. 1 and 2 of the drawings, is also employed with the gas heating form of roaster shown in Figs. 5 to 7 of the drawings, it being understood that a plurality of these carriers may be used in gang formation where it is desired to roast a plurality of frankfurters at the same time.

In Figs. 9 to 11 of the drawings, I show a still further modification of the invention designed for roasting hamburger steaks. When used for this purpose, the roaster may comprise a two-part receptacle having a bottom or base 46 and a movable such as a hinged lid section 47 provided with a handle 48. These receptacle sections are provided in turn with the heating units 49 and 50 which, when the lid 47 is closed, form a receptacle having a shape or dimensions substantially the same as those of the preformed hamburger steak so that the heating units form or define a substantially close fitting envelope for the edible, as will be readily understood. For cooperation with this form of toaster, I employ a carrier C' having an open cradle 51 attached to a handle 52, the said cradle having a design or construction similar to the cradle 15 heretofore described and being made of strips which are given a contour, as shown in Fig. 10 of the drawings, for closely fitting the heating unit 49 of toaster.

Each of the heating units, such as 49 or 50, is preferably made in the same way as the heating receptacles heretofore described, and comprises a metal dish having an insulating such as an enameled coating 53 first painted by means of a conductive paint 54 over which is electro-plated a coating of nickel 55, the nickel or/and paint coatings being spiralled, as shown in Fig. 11 of the drawings, for producing a resistance unit of predetermined value, the spiralling being indicated by the reference character 56. Electrical connection to this resistance unit may be made by soldering electric wires to the terminals 57 and 58 of the spiral, the heating units 49 and 50 thus produced being connected in parallel as by means of the conductors 59 and to a plug or socket 60 attached to and forming part of the toaster unit. The electric cord 61 is in the usual way receivable by the plug or socket 60 and is attachable to the power line receptacle.

The electrical toasting apparatus shown in Figs. 9 and 10 of the drawings is intended to be used in the same way as that shown in Figs. 1 to 4 of the drawings. The hamburger steak preformed in shape is inserted in the cradle of the carrier C' and the carrier is then placed in the toaster and the lid 47 is then closed. Movement of the handle 52 of the carrier C' sideways will rotate the carrier and tend to free the steak from adhering to the lower half of the heater.

After being toasted, the steak can then be put on a plate or in a sandwich by inversion of the carrier and without further manual handling.

The manner of making and using the toasting apparatus of the present invention, the method of toasting edibles, and the many advantages of both the method and apparatus, will in the main be fully apparent from the above detailed description thereof. It will be further apparent that while I have shown and described my invention in the preferred forms, many changes and modifications may be made in the structure disclosed without departing from the spirit of the invention, defined in the following claims.

What I claim is:

1. A roaster for meats of a preformed shape and size comprising a receptacle having an internal shape and size substantially the same as those of the so preformed meat whereby the receptacle forms a casing for closely enveloping the meat, and means for heating said receptacle over its meat enveloping surface, whereby the meat is roasted by conduction of heat from the walls of the receptacle.

2. A roaster for frankfurters comprising a tubular receptacle forming a substantially close fitting enveloping casing for the frankfurter, and means for heating said receptacle over substantially its complete enveloping surface, whereby the meat is roasted by conduction of heat from the walls of the receptacle.

3. A roaster for frankfurters comprising a receptacle having an internal shape and dimension substantially the same as those of the frankfurter whereby the receptacle forms an enveloping casing for the frankfurter, and means for heating said receptacle substantially over its complete enveloping surface, whereby the meat is roasted by conduction of heat from the walls of the receptacle, the ends of the receptacle being heated more intensely than the center for effecting uniform heating of the frankfurter.

4. A roaster for meats of preformed shape and dimensions comprising a holder, a plurality of receptacles arranged in gang formation on the holder, each receptacle having an internal shape and dimension substantially the same as those of the meat whereby each receptacle forms a substantially close fitting enveloping casing for the meat, and means for heating said receptacles whereby the meat is roasted by conduction of heat from the walls of the receptacles.

5. A frankfurter roaster comprising a holder, a plurality of tubular receptacles arranged in collateral formation on said holder, each receptacle forming a substantially close fitting enveloping casing for the frankfurter, and means for heating said receptacles substantially over their complete enveloping surface whereby the meat is roasted by conduction of heat from the walls of the receptacles.

6. An electric roaster for edibles of preformed shape and dimensions comprising a receptacle having an internal shape and dimensions substantially the same as those of the edible whereby the receptacle forms an enveloping casing for the edible, the said receptacle comprising a metallic shell, an insulating base on the external wall of said shell and an electrically conductive resistor coating on said base.

7. An electric roaster for edibles comprising a receptacle having an internal shape and dimensions substantially the same as those of the edible whereby the receptacle forms an enveloping casing for the edible, the said receptacle comprising a metallic shell, an insulating base on said shell, an electrically resistive paint coating on the base and a spiralled electro-deposited conductive film on said paint coating.

8. A roaster for frankfurters comprising a casing and a plurality of heating tubes arranged in gang formation on the casing, each tube having a cross-sectional area substantially the same as that of the frankfurter, and means for heating said tubes to produce a uniform roasting action by the heated walls of the tubes directly on a frankfurter pushed inside of any one of the tubes.

Signed at New York in the county of New York and State of New York this 2nd day of July A. D. 1928.

JOSEPH A. FLANZER.